C. H. KICKLIGHTER.
INDUCTION SYNCHRONOUS MOTOR.
APPLICATION FILED SEPT. 10, 1908.
1,027,422.
Patented May 28, 1912.
3 SHEETS—SHEET 1.
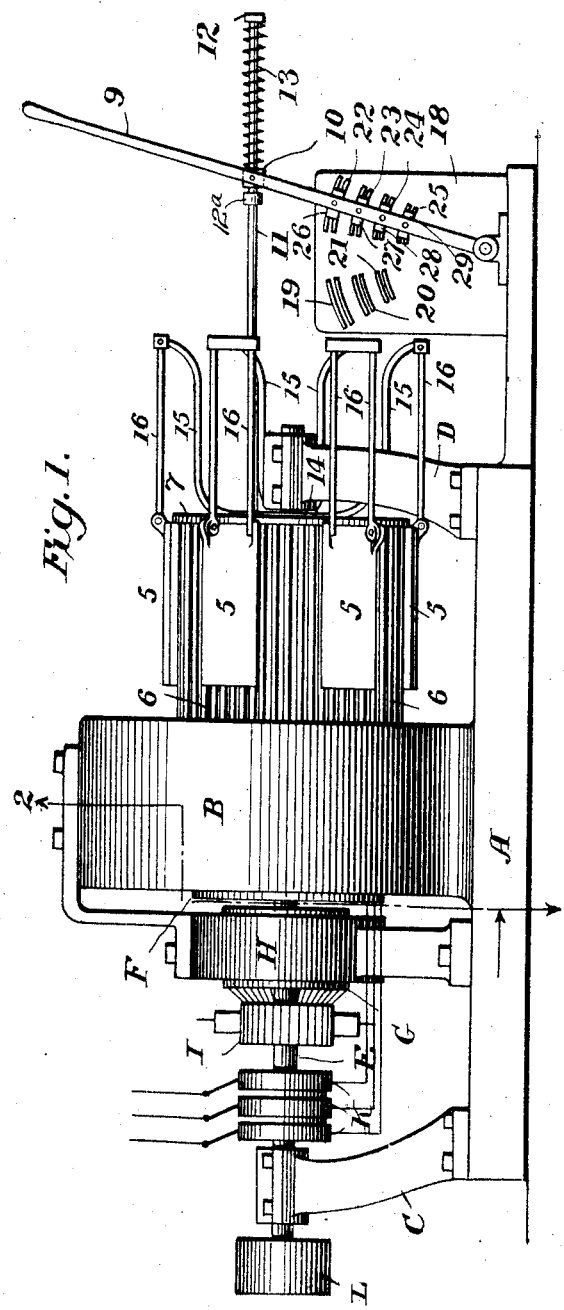
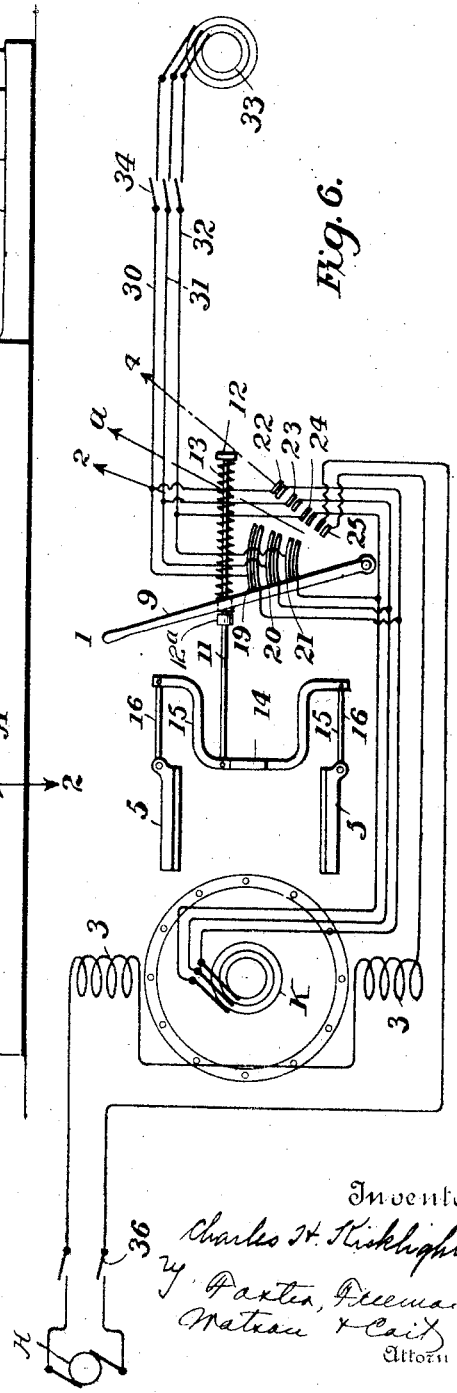

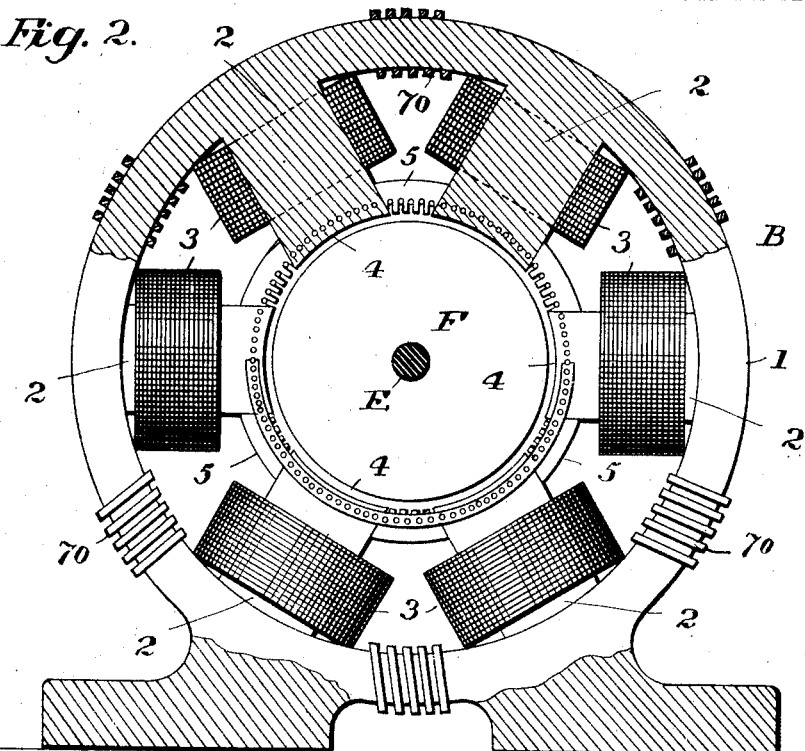
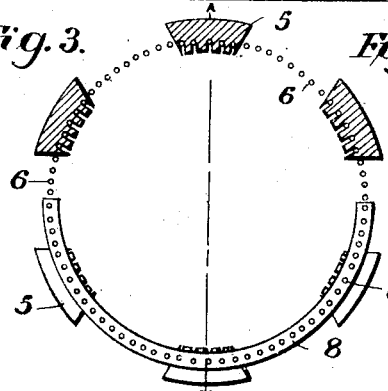
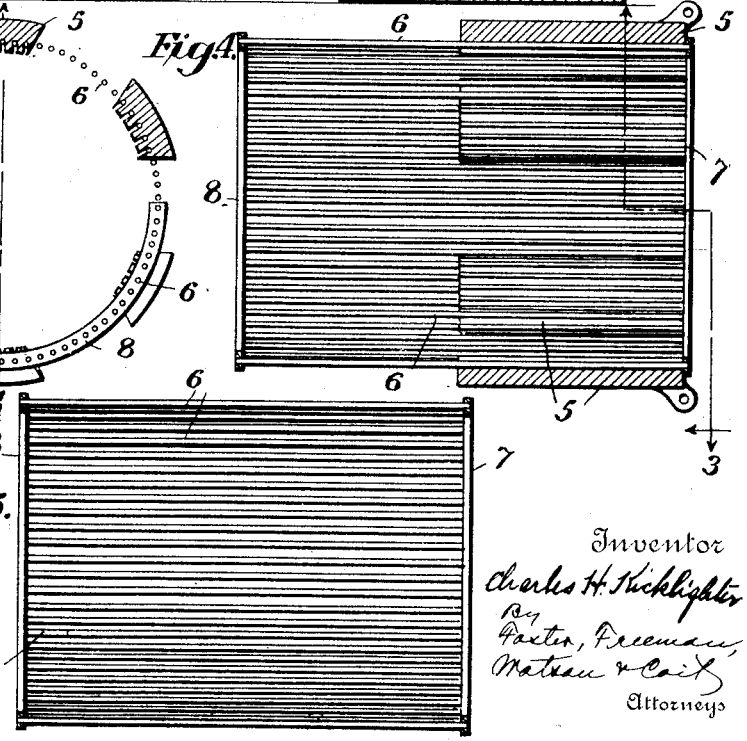

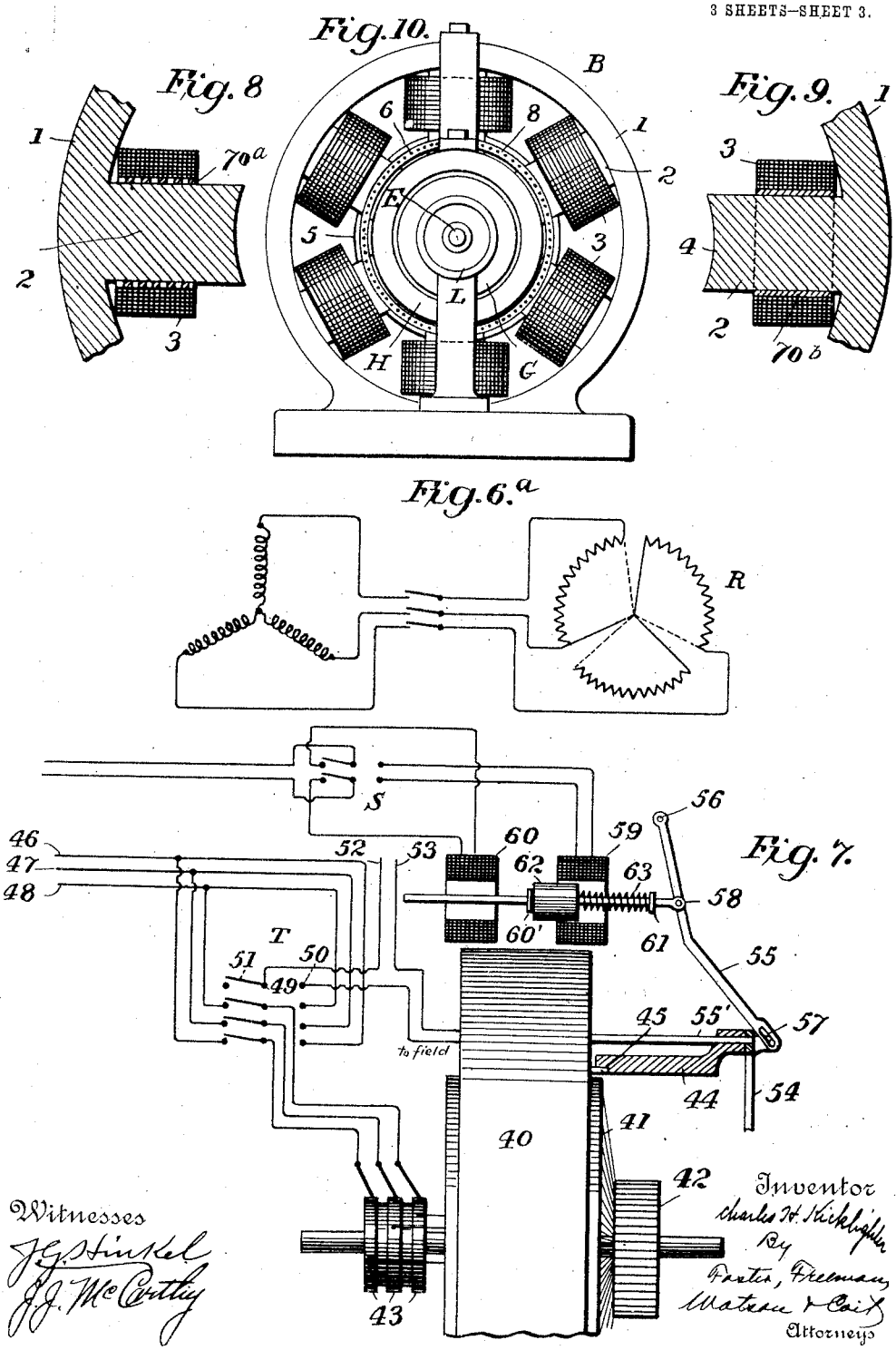

UNITED STATES PATENT OFFICE.

CHARLES H. KICKLIGHTER, OF NEWBERRY, SOUTH CAROLINA.

INDUCTION SYNCHRONOUS MOTOR.

1,027,422.      Specification of Letters Patent.      Patented May 28, 1912.

Application filed September 10, 1908. Serial No. 452,433.

*To all whom it may concern:*

Be it known that I, CHARLES H. KICK-LIGHTER, a citizen of the United States, and resident of Newberry, South Carolina, have invented certain new and useful Improvements in Induction Synchronous Motors, of which the following is a specification.

This invention relates to dynamo electric machines and particularly to motors which are driven by alternating current.

The main object of the invention is to provide an alternating current motor which may be operated efficiently either as a synchronous motor or as an induction motor, and which is readily convertible from one into the other.

The term synchronous motor is well understood in the art to mean a motor in which one of the two relatively movable members is provided with magnetic poles which are fixed in position while the other member is provided with a winding which, when connected to a suitable source of alternating current, produces a magnetic field the poles of which rotate. In this type of machines the revolutions of the movable part correspond exactly to the speed of rotation of the rotating magnetic field produced by the alternating current. The operation of this class of machines is well understood and need not be discussed at length. It may be observed, however, that while these machines operate satisfactorily when brought up to speed, and are very valuable under many circumstances (as for instance as power-factor regulators or upon circuits having high inductions), they are difficult to start and under the best circumstances will start only under a very light load and, in any event, a very large starting current is drawn from the supply source. The induction motor, as is also well understood, comprises two relatively movable members upon one of which is mounted what may be termed the inducing winding and which is adapted to produce a rotating field when connected to a suitable source of alternating current. Upon the other member is mounted what is usually termed the induced winding which is not metallically connected with any source of electric supply, the current flowing in it being induced therein by magnetic induction. Such motors, as is well known, do not run at a speed synchronous with the rotation of the magnetic field but have a "slip" with relation thereto depending upon the load and other conditions as is well understood. These motors, however, have the property of starting under load and, when efficiently constructed, the starting current which is drawn from the source is not so large as to exercise a disturbing influence upon the circuit.

According to the present invention there is produced in a single machine a synchronous motor and an induction motor either of which may be used as circumstances may dictate and either of which will operate efficiently. There is thus obtained a single machine which embodies the desirable starting and other characteristics of the induction motor with the advantages of running which are inherent in the synchronous motor. In starting the machine, the machine may be operated as an induction motor and, after speed has been attained, it may be operated as a synchronous motor. It has previously been proposed to start a synchronous motor by an inefficient induction motor action by placing skeleton bridges between the pole pieces, these bridges being sometimes of copper and sometimes of iron, the rotating field produced by the application of the alternating current serving to induce eddy currents in the pole pieces, or currents in the bridges, and by this means sufficient torque could be produced, by drawing a large amount of alternating current from the line, to start the motor providing it were not loaded. With load the motor cannot be started at all for, even with the bridges referred to, the distribution of the magnetic flux is such as to produce a most inefficient action.

According to the present invention a structure adapted to operate as a synchronous motor is provided with means for furnishing an induced winding in close proximity to the inducing member, the said induced winding being backed throughout by magnetic material sufficient to carry the inducing magnetism, the induction motor thus produced conforming to the conditions of greatest efficiency as determined by the design of induction motors pure and simple. While the induction motor feature is of peculiar value in connection with starting the machine, it will be apparent that, being efficient in its operation, the machine may be operated either as an induction motor or as a synchronous motor at any time as circumstances may dictate. This is obviously not true of the synchronous motors of the prior art above referred to in which the induction motor feature is employed for starting purposes as indicated. The inefficient operation of such machines as induction motors would preclude their use as such commercially except for the briefest time and, as above noted, under load they could not be used as induction motors.

In starting synchronous motors as induction motors as before described, it was necessary to disconnect the direct current field windings at various points in order to prevent the development of enormous voltages between their terminals as a result of the alternating magnetism threading these windings.

It is a further object of the invention to provide means for preventing alternating magnetism from threading the direct current field coils thus doing away with the necessity of opening up their connections and preventing possible damage to the apparatus which might occur, without such means, even if the field coils were connected as described.

A further object of the invention is to provide means for controlling the electrical connections of the motor.

Ancillary objects will appear hereinafter.

In the drawings which illustrate the invention: Figure 1 is a side elevation of a dynamo electric machine embodying the invention; Fig. 2 is a section on the line 2—2 of Fig. 1, looking in the direction of the arrow, the magnetic connectors being in position to produce an efficient operating induction motor; Fig. 3 is a partial end view and a partial transverse section of the magnetic connectors and the induced winding separated from the remainder of the machine, the view shown in this figure being taken on the line 3—3 of Fig. 4; Fig. 4 is a section on the line 4—4 of Fig. 3; Fig. 5 is a view of the induced winding detached, this figure being a section of that winding taken on the line 4—4 of Fig. 3; Fig. 6 is a diagram showing the electrical connections; Fig. 6ª is a diagram showing the induced winding connected in star and to a resistance in the well known manner; Fig. 7 is a diagram showing a portion of a rotary converter and apparatus and connections embodying a modification of the invention; Fig. 8 is a fragment of the machine in section showing a modified structure for preventing the passage of alternating magnetism through the pole pieces and yoke; Fig. 9 is still another modification of apparatus for the same purpose; and, Fig. 10 is an end view of the apparatus shown in Fig. 1.

Referring to the drawings and at first to Figs. 1 to 6. inclusive, and Fig. 10, the machine comprises a bed plate A upon which are mounted the field frame B and the pedestals C and D which support the bearings for the shaft E of the member F which rotates within the field frame B. Also mounted upon the shaft E is the armature G of an exciter the field frame H of which is supported from the bed plate A. While the exciter thus mounted is of peculiar advantage in connection with isolated motors and in general a compact structure is obtained, where the motor is in a power station or other location where another source of excitation is available or convenient, the exciter may be omitted. The commutator I of the exciter armature is connceted with the direct current windings upon the frame B. Sliprings K are mounted upon and turn with the shaft E. These sliprings are connected to the rotary member F of the machine and by coöperation with suitable brushes alternating current is supplied through these rings to the member F. L is a pulley fixed upon the shaft E whereby power may be transmitted from the motor.

Referring now in detail to the drawings; the field frame B comprises a yoke 1 from which project pole pieces 2. These pole pieces are surrounded by direct current windings 3 by which the pole pieces are energized so that poles of constant polarity are formed in the manner as is well understood. The pole faces 4 of these pole pieces are presented in close proximity to the rotary member F. This rotary member may be of any of the well known constructions having windings capable of producing, when connected to a suitable source of alternating current, a rotating magnetic field, that is, a field of which the magnetism rotates about the axis of the member and with relation to the member itself. Inasmuch as the construction and winding of motor members for producing a rotating field as described is well understood, it has not been illustrated in detail.

The machine thus far described is a synchronous motor and, when brought up to speed and direct current supplied to the field windings and alternating current supplied to the winding upon the movable member it will operate synchronously. In order to cause the machine to operate as an induction motor at starting or at other times, magnetic connectors 5 are provided and also an induced winding. The magnetic connectors 5 are, of course, formed of some magnetic material such as iron and are adapted to fit closely between the inner ends of the pole pieces so that a continuous ring of magnetic material is formed about the rotary member F and in close proximity thereto.

At or adjacent to the inner faces of the pole pieces and the magnetic connectors is placed the induced winding. It may be here noted that the terms "induced" and "inducing" as used in this specification refer to alternating current phenomena, the inducing winding being that which is connected to a source of alternating currents and whereby alternating magnetism is produced, while the induced winding is that which is not metallicly connected with a source of current but has current induced in it by the alternating magnetism produced by the inducing winding; also as referred to herein the inducing member is that which carries the inducing winding.

The induced winding is, in the structure shown, composed of longitudinally extending conducting bars 6 which are connected together at their ends by the rings 7 and 8, the well known "squirrel cage" winding being thus formed. These bars extend longitudinally of the pole faces as shown and also to a considerable extent beyond the same as shown clearly in Fig. 1.
The magnetic connectors 5 slide upon the bars 6 and are adapted to fit closely between the pole pieces so that good magnetic connection will be formed. Also the magnetic connectors are of such cross section as to provide ample paths for the magnetic flux generated by the alternating current in the windings upon the inducing member. The dimensions of these connectors is to be determined in any particular case by a consideration of the flux which is to be carried thereby, and is arrived at in the same manner as the dimensions of the magnetic parts of a simple induction motor.

It will be observed that the bars 6 of the induced winding are uniformly distributed about the continuous magnetic ring about the rotary member over the pole faces and the magnetic connectors and are in close proximity to that member.
With the magnetic connectors 5 in position between the pole pieces we have the induction motor as just described but when the direct current field windings are excited, the magnetic connectors 5 would operate to conduct the magnetism from one pole to the next without its passing through the rotary member. This would obviously be disastrous and therefore, when the machine is to operate as a synchronous motor, the connectors 5 are removed by sliding them along the rods 6.

The sliding of the magnetic connectors upon the rods is effected by means of a lever 9 suitably pivoted to the bed plate and to a cross head 10 sliding upon a rod 11, which has fixed thereon a collar 12$^a$. Between the abutment 12 fixed to one end of the rod 11 and the cross head 10 is interposed a compression spring 13. At its other end the rod 11 is pivoted to a frame comprising a ring 14 circumscribing and sliding upon the shaft E and carrying the arms 15 forming a spider. To the extremities of these arms are pivoted links 16 which are also pivoted to the magnetic connectors 5. By pressing the lever 9 toward the machine the spider is moved in the same direction and the magnetic connectors are inserted between the pole pieces. As before noted the machine is then in condition to operate as an induction motor. If now it be desired to operate the machine as a synchronous motor the lever 9 is pressed away from the machine when the spring 13 will be compressed, the magnetic connectors being held between the pole pieces for a reason as will hereinafter appear. Upon the release of the magnetic connectors the spring will quickly withdraw them from between the pole pieces when the machine will be in condition to operate as a synchronous motor. It is also to be observed that there is supported by the bed plate A a switchboard 18, having the pairs of contacts 19, 20 and 21 and also the pairs of contacts 22, 23, 24 and 25. It will be seen that the contacts 26, 27 and 28 fixed to the lever 9 and insulated therefrom will engage with and connect together the contacts of the pairs 19, 20 and 21, respectively, while the lever is at the left hand side of its travel. The contacts 19, 20 and 21 will then pass out of engagement with the pairs of stationary contacts referred to, as the lever is moved toward the right, the connections between the contacts of the respective pairs of the stationary contacts being then broken and then, as the lever is moved still farther toward the right the movable contacts 26, 27 and 28 will respectively connect the contacts of the stationary pairs 22, 23 and 24 while the contacts of the pair 25 will be connected by the movable contact 29.

Referring now to the diagram in Fig. 6, it will be seen that when the lever 9 is in its left hand position and during a considerable movement toward the right therefrom, the three phase conductors 30, 31 and 32 which extend to the source 33 of alternating current, and which may be controlled by a switch 34, are respectively connected with the sliprings K upon the rotary member of the motor. When, however, the lever 9 has reached the position as indicated by the dotted line $a$ at which the contacts 26, 27 and 28 have passed beyond the pairs of contacts 19, 20 and 21, the connection of the alternating current source with the sliprings will be broken. Upon further movement of the lever 9 to the right, however, the pairs of contacts 22, 23, 24 and 25 will be respectively connected together when the alternating current source will be again connected to the sliprings and a circuit from the direct current source 35 (in which may be placed a double pole switch 36 if desired) will be completed through the direct current field windings 3 by means of the pair of contacts 25 and the movable contact 29.

It will now be apparent that with the lever in the left hand position the magnetic connectors will be inserted between the pole pieces and that the alternating current source will be connected to the winding upon the inducing member thereby producing a rotating field in that member. This rotating field will induce currents in the induced winding after the well known manner as in induction motors and the motor will start up, under load if necessary. If now it be desired to change the motor to a synchronous one, as when it is up to speed, the lever 9 is moved toward the right, the lost motion connection afforded by the sliding cross head 10 permitting the movement of the lever without a corresponding movement of the spider and the magnetic connectors. During this movement of the lever 9, however, power is stored in the spring 13 and when the lever reaches the position designated by $a$, when the alternating current connections will be broken, the compressed spring 13 will quickly withdraw the magnetic connectors from between the pole pieces. Prior to the breaking of the alternating current connections the magnetism will hold those connectors in position between the pole pieces and it is only after this magnetism is destroyed by the breaking of the connections that the spring is sufficiently strong to remove the magnetic connectors. As the lever is moved still farther to the right the alternating connections with the winding of the inducing member are again established and also the direct current windings for producing the fixed polarity field poles are connected in circuit with the direct current source. The machine is then in condition to operate as a synchronous motor.

It is desirable, as before noted, that the entire flux from the inducing member shall pass through the magnetic connectors when the motor is arranged to operate as an induction motor. And also it is desirable to prevent the alternating magnetic flux from threading through the field coils as has been before pointed out. To prevent therefore, the shunting off of alternating magnetism from the magnetic connectors through the pole pieces and yoke and also the traversing of the direct current field coil by alternating magnetism, I provide means for opposing the traversing of such magnetism through paths which it tends to take through the pole pieces and yoke. In the structure shown this means may take the form of short circuited coils 70 surrounding the paths referred to and to accomplish this end these coils may be placed upon the yoke as in Fig. 2 or may be placed about the pole pieces as in Figs. 8 and 9 where they are designated by 70$^a$ and 70$^b$ respectively. Also these short circuited coils may each be of a plurality of turns as in Figs. 2 and 8 or each may consist of a sleeve 70$^b$ constituting a single turn as in Fig. 9. A peculiarly efficient action in starting is obtained by connecting the induced windings in star and to a resistance R as shown in Fig. 6$^a$, the characteristics of this connection being well understood in the art.

Referring to the modification shown in Fig. 7, the rotary converter shown therein comprises the frame 40, armature 41, commutator 42, sliprings 43 the induced winding 45 and the magnetic connectors 44. Conductors extend from the sliprings to the blades of a double throw switch T, the contacts upon either side being connected with the respective alternating current mains 46, 47 and 48 which lead to a three phase source so that in whichever direction the switch is thrown the alternating winding upon the armature of the rotary converter will be connected with the three phase source. These connections are, however, broken when the switch is in an intermediate position. The field and windings thereon may be the same as shown in Figs. 1 to 6, inclusive, the direct current windings thereon being connected through contacts 49 and 50 and blade 51 of switch T with a source of direct current to which the conductors 52 and 53 lead. The magnetic connectors rest at their ends upon the bars of the induced winding, when withdrawn, as shown in the drawing. This answers all purposes and it is unnecessary to make the bars of the induced windings so long as with the arrangement shown in Fig. 1. The connectors 44 are secured to a frame 54 which slides upon bars 55' fixed to the frame of the machine at one end, the other end being free. The frame 54 with the connectors is moved by means of a link 55 pivoted to a stationary part at 56 and secured to the frame 54 by a pin and slot connection 57. Pivoted to the link 55 is rod 58 which extends through the solenoids 59 and 60. Fixed to the rod 58 are two abutments 60' and 61 while slidably mounted upon the rod is a plunger 62 of magnetic material adapted to be acted upon by the solenoids. Between the plunger and the abutment 61 is interposed the compression spring 63. The connection of the solenoids with the current supply is controlled by the switch S.

With the parts in the position as shown, if it be desired to start the converter both switches T and S will be thrown to the left. The direct current field winding is then disconnected while the alternating current source is connected with the winding upon the armature. Also the solenoid 60 being energized the plunger 62 will be attracted to it and will draw with it the bar 58 and link 55, thus moving the connectors 44 into position between the pole pieces. The rotating field produced by the inducing winding on the armature will cut the induced winding and the machine will start as an induction motor. The switch S may now be thrown to the right when the solenoid 60 will be deënergized and the solenoid 59 energized. The plunger will be drawn to the latter and the spring 63 compressed. The magnetic connectors will not move, however, being held in place by magnetic attraction. When speed has been reached, the switch T may be thrown to the right. When it is open the magnetism holding the magnetic connectors in place will disappear, when the spring will quickly withdraw them to the position shown in the drawing. Upon completing the throw to the right the inducing winding will be reconnected with the alternating current source and the direct current field winding will be connected with its source. The converter will now operate synchronously.

While the invention has been illustrated by the accompanying drawings, the structures may be varied in numerous ways therefrom without departing from the spirit of the invention. The invention is not therefore limited to the structures shown.

What I claim is:—

1. In a dynamo electric machine, the combination with a field frame comprising a yoke and pole pieces projecting therefrom, of removable magnetic connectors extending between the pole pieces, an inducing member, said inducing member and field frame being relatively movable, a winding upon said inducing member adapted to be connected to a source of alternating current and to produce a rotating field when so connected, a direct current winding upon said field frame to excite said pole pieces and to produce field poles therein, and an induced winding upon said frame in close proximity to said inducing member.

2. In a dynamo electric machine, the combination with a field frame comprising a yoke and pole pieces projecting therefrom, of removable magnetic connectors extending between the pole pieces, an inducing member, said inducing member and field frame being relatively movable, a winding upon said inducing member adapted to be connected to a source of alternating current and to produce a rotating field, direct current winding upon said field frame to excite said pole pieces and to produce fixed poles therein, and an induced winding distributed about said inducing member over the pole faces and magnetic connectors.

3. In a dynamo electric machine, the combination with a field frame comprising a yoke and pole pieces projecting therefrom, of movable magnetic connectors extending between the pole pieces, direct current winding upon said field frame to excite said pole pieces and to produce fixed poles therein, a member carrying a winding adapted to be connected to a source of alternating current, said member and field frame being relatively movable, and means for removing said magnetic connectors.

4. In a dynamo electric machine, the combination with a field frame comprising a yoke and pole pieces projecting therefrom, of movable magnetic connectors extending between the pole pieces, direct current winding upon said field frame to excite said pole pieces and to produce fixed poles therein, a member carrying a winding adapted to be connected to a source of alternating current and to produce a rotating field, said member and field frame being relatively movable, and means for removing said magnetic connectors simultaneously.

5. In a dynamo electric machine, the combination with a field frame comprising a yoke and pole pieces projecting therefrom, of removable magnetic connectors extending between the pole pieces, a member carrying a winding adapted to be connected to a source of alternating current, direct current winding upon said field frame to excite said pole pieces and to produce fixed poles therein, said frame and member being relatively movable and means for opposing the passage of alternating magnetics through said pole pieces and yoke.

6. In a dynamo electric machine, the combination with a field frame comprising a yoke and pole pieces projecting therefrom, of removable magnetic connectors extending between the pole pieces, a member carrying a winding adapted to be connected to a source of alternating current, direct current winding upon said field frame to excite said pole pieces and to produce fixed poles therein, said frame and member being relatively movable and short circuited coils surrounding the paths which the alternating magnetism tends to take through said pole pieces and yoke.

7. In a dynamo electric machine, the combination with a field frame comprising a yoke and pole pieces projecting therefrom, of an inducing member, said inducing member and field frame being relatively movable, a winding upon said inducing member adapted to be connected to a source of alternating current and to produce a rotating field, said inducing member and field frame being relatively movable, direct current winding upon said frame to excite said pole pieces and to produce fixed poles therein, removable magnetic connectors extending between the pole pieces and forming with said pole pieces a continuous magnetic ring in close proximity to said inducing member and an induced winding uniformly distributed about said ring.

8. In a dynamo electric machine, in combination, a field having poles provided with a direct current winding, an armature adapted to be connected to a source of alternating current, means to magnetically connect the pole so as to form therewith a magnetically continuous ring in close proximity to the armature, a winding upon the armature adapted to produce a rotating field when connected to a suitable source of alternating current, an induced winding distributed about said ring and coöperating with the rotating field to operate the machine at times as an induction motor, and means to oppose the passage of alternating magnetism through the poles and the direct current winding thereon and divert the same into the connectors between the poles.

9. In a dynamo electric machine, the combination with a field frame comprising a yoke and pole pieces projecting therefrom, of a direct current winding upon said frame adapted to produce poles of fixed polarity therein when connected to a source of direct current, removable magnetic connectors extending between said pole pieces, an induced winding upon said frame, an inducing member having a winding adapted to produce a rotating field when connected to a suitable source of alternating current, a switch comprising contacts for establishing the electrical connections of the windings and a common means for actuating said magnetic connectors and said switch.

10. The combination with a dynamo electric machine comprising a field frame having a yoke and pole pieces projecting therefrom, removable magnetic connectors extending between said pole pieces, an induced winding upon said frame, a direct current winding adapted to produce poles of fixed polarity also upon said frame, and an inducing member having a winding adapted to produce a rotating field when connected to a suitable source of alternating current, of a source of alternating current, a source of direct current, and a switch having contacts and connections adapted to connect the winding upon said inducing member with said source of alternating current, to disconnect the same, and to then reconnect the same and at the same time connect said direct current winding with said source of direct current.

11. The combination with a dynamo electric machine comprising a field frame having a yoke and pole pieces projecting therefrom, removable magnetic connectors extending between said pole pieces, an induced winding upon said frame, a direct current winding adapted to produce poles of fixed polarity also upon said frame, and an inducing member having a winding adapted to produce a rotating field when connected to a suitable source of alternating current, of a switch comprising contacts and connections adapted to connect the winding upon said inducing member with said source of alternating current, to disconnect the same, and to then reconnect the same and at the same time connect said direct current winding with said source of direct current, means for actuating said magnetic connectors and said switch, the said actuating means being so related that said magnetic connectors are withdrawn when said alternating current source is disconnected from the winding upon said inducing member.

12. The combination with a dynamo electric machine comprising a field frame having a yoke and pole pieces projecting therefrom, removable magnetic connectors extending between said pole pieces, an induced winding upon said frame, a direct current winding adapted to produce poles of fixed polarity also upon said frame, and an inducing member having a winding adapted to produce a rotating field when connected to a suitable source of alternating current, of a source of alternating current, a source of direct current, a switch comprising contacts and connections adapted to connect the winding upon said inducing member with said source of alternating current, to disconnect the same, and to then reconnect the same and at the same time connect said direct current winding with said source of direct current, means for actuating said switch and said magnetic connectors, including a lost motion connection between the actuating means and one of said last mentioned members.

13. The combination with a dynamo electric machine comprising a field frame having a yoke and pole pieces projecting therefrom, removable magnetic connectors extending between said pole pieces, an induced winding upon said frame, a direct current winding adapted to produce poles of fixed polarity also upon said frame, an inducing member having a winding adapted to produce a rotating field when connected to a suitable source of alternating current, of a source of alternating current, a source of direct current, a switch comprising contacts and connections adapted to connect the winding upon said inducing member with said source of alternating current, to disconnect the same, and to then reconnect the same and at the same time connect said direct current winding with said source of direct current, means for actuating said magnetic connectors, and said switch and a power storing connection between the said actuating means and one of said last mentioned members.

14. The combination with a dynamo electric machine comprising a field frame having a yoke and pole pieces projecting therefrom, removable magnetic connectors extending between said pole pieces, an induced winding upon said frame, a direct current winding adapted to produce poles of fixed polarity also upon said frame, an inducing member having a winding adapted to produce a rotating field when connected to a suitable source of alternating current, of a source of alternating current, a source of direct current, a switch comprising contacts and connections adapted to connect the winding upon said inducing member with said source of alternating current, to disconnect the same, and to then reconnect the same and at the same time connect said direct current winding with said source of direct current, and said magnetic connectors, means for actuating said switch and a spring connection between said actuating means and one of said last mentioned members.

15. In a dynamo electric machine having a shaft, in combination, a field having poles provided with a direct current winding, an armature adapted to be connected to a source of alternating current, removable magnetic bridges connecting the poles, and guiding means whereby said bridges may be caused to move longitudinally of the shaft into and out of operative position.

16. In a dynamo electric machine, in combination, a field having poles provided with a direct current winding, an armature adapted to be connected to a source of alternating current, an induced winding distributed around the armature and located in the pole faces, and means to oppose the passage of alternating magnetism through the poles and the direct current winding thereon.

17. In a dynamo electric machine, in combination, a field having poles provided with a direct current winding, an armature adapted to be connected to a source of alternating current, magnetic connectors adapted to be placed in position to connect the poles, guides for the connectors whereby they may be moved into and out of operative position and means to oppose the passage of alternating magnetism through the poles and the direct current winding thereon.

18. In a dynamo electric machine, in combination, a field having poles provided with a direct current winding, an armature adapted to be connected to a source of alternating current, magnetic connectors adapted to be placed in position to connect the poles, and in inoperative position and means for guiding the magnetic connectors into and out of operative position while the machine is running.

19. In a dynamo electric machine, in combination, a field having poles provided with a direct current winding, an armature adapted to be connected to a source of alternating current, magnetic connectors adapted to be placed in position to connect the poles, guides for the magnetic connectors, and operating means for moving the connectors out of operative position.

20. In a dynamo electric machine, in combination, a field having poles provided with a direct current winding, an armature adapted to be connected to a source of alternating current, magnetic connectors adapted to be placed in position to connect the poles, and a spring connected to the connectors to move them out of operative position.

21. In a dynamo electric machine, in combination, a field having poles provided with a direct current winding, an armature adapted to be connected to a source of alternating current, magnetic connectors adapted to be placed in position to connect the poles, a spring constructed to move the connectors out of operative position, and means to place the spring under tension.

22. In a dynamo electric machine, in combination, a field having poles provided with a direct current winding, an armature, a switch constructed when in one position to connect the armature to a source of alternating current, and when in another position to connect the armature to a source of alternating current and the field winding to a source of direct current, magnetic connectors adapted to be placed in operative position to connect the poles, and a source of stored power connected to the magnetic connectors to move them to inoperative position.

23. In a dynamo electric machine, in combination, a field having poles provided with a direct current winding, an armature, a switch constructed when in one position to connect the armature to a source of alternating current, and when in another position to connect the armature to a source of alternating current and the field winding to a source of direct current, magnetic connectors adapted to be placed in operative position to connect the poles, a spring constructed to move the connectors to inoperative position, and means to place the spring under tension.

24. In a dynamo electric machine, in combination, a field having poles provided with a direct current winding, an armature, a switch constructed when in one position to connect the armature to a source of alternating current, and when in another position to connect the armature to a source of alternating current and the field winding to a source of direct current, magnetic connectors adapted to be placed in operative position to connect the poles, a source of stored power connected to the magnetic connectors to move them to inoperative position, and means constructed to store power and operate the switch.

25. In a dynamo electric machine, in combination, a field having poles provided with a direct current winding, an armature adapted to be connected to a source of alternating current, means to magnetically connect the poles, and means to oppose the passage of alternating magnetism through the poles and the direct current winding thereon and divert the alternating magnetism through the connectors.

26. In a dynamo electric machine, in combination, a field having poles provided with a direct current winding, an armature adapted to be connected to a source of alternating current, an induced winding distributed around the armature and located in the pole faces and in the spaces between the poles, and means to oppose the passage of alternating magnetism through the poles and the direct current winding thereon at starting and divert the alternating magnetism through the induced winding.

27. In a dynamo electric machine, in combination, a field having poles provided with a direct current winding, an armature adapted to be connected to a source of alternating current, removable magnetic bridges connecting the poles, and an induced winding distributed around the armature and located in the pole faces and in said bridges.

In testimony whereof I affix my signature in presence of two witnesses.

CHARLES H. KICKLIGHTER

Witnesses:
 CURRY H. TAYLOR,
 THOMAS HOWE.